United States Patent [19]

Droulon et al.

[11] Patent Number: 5,265,936
[45] Date of Patent: Nov. 30, 1993

[54] LOCKING DEVICE FOR LOCKING TWO ELEMENTS THAT ARE ARTICULATED RELATIVE TO ONE ANOTHER

[75] Inventors: Georges Droulon; Paul Jaudouin, both of Orne, France

[73] Assignee: Bertrand Faure Automobile, Essonne, France

[21] Appl. No.: 911,682

[22] Filed: Jul. 10, 1992

[30] Foreign Application Priority Data

Jul. 10, 1991 [FR] France ................. 91 08691

[51] Int. Cl.$^5$ .................. B60N 2/02; B60N 2/48; E05D 11/10
[52] U.S. Cl. ................ 297/361.1; 297/216.1; 16/324; 403/110; 403/328
[58] Field of Search ............ 297/361, 362, 354, 355; 16/321, 324, 325, 341; 403/87, 110, 327, 328; 188/67, 265

[56] References Cited

U.S. PATENT DOCUMENTS

| | | | |
|---|---|---|---|
| 4,175,301 | 11/1979 | Letournoux et al. | 16/325 |
| 4,382,630 | 5/1983 | Weston | 297/362 |
| 4,789,205 | 12/1988 | Pipore et al. | 16/341 X |
| 4,805,961 | 2/1989 | Garrod | 297/361 |
| 5,058,240 | 10/1991 | Barda et al. | 16/325 |
| 5,150,632 | 9/1992 | Hein | 297/354 X |

FOREIGN PATENT DOCUMENTS

| | | | |
|---|---|---|---|
| 3046888 | 7/1982 | Fed. Rep. of Germany | 297/354 |
| 3510006 | 6/1986 | Fed. Rep. of Germany | 297/354 |

*Primary Examiner*—Clifford D. Crowder
*Assistant Examiner*—John J. Calvert
*Attorney, Agent, or Firm*—Robert W. Becker & Associates

[57] ABSTRACT

A locking device is made of a casing having a substantially trapezoidal shape and a rod extending through the casing. The rod has a central portion and two side guides to permit the central portion to come into locking engagement with a toothed roller placed inside toothed triangular recesses of a V-shaped member. The V-shaped member has a top portion provided with a fork. One side of the V-shaped member is connected to an inner edge of the casing and the other side has a cutout with a lower rounded portion and an upper straight portion provided with a slope. The cutout cooperates with a cam comprising a flat portion and a finger.

8 Claims, 3 Drawing Sheets

LOCKING DEVICE FOR LOCKING TWO ELEMENTS THAT ARE ARTICULATED RELATIVE TO ONE ANOTHER

FIELD OF THE INVENTION

The present invention relates to a single-roller locking device for locking two elements that are articulated relative to one another, particularly for the use in seats of various vehicles and more particularly in those including a seat back adjustable in inclination and those including means for adjusting the height of the sitting portion of the seat.

BACKGROUND OF THE INVENTION

Practically all vehicles presently on the market comprise, in the front of the vehicle, seats with a back portion the inclination of which is adjustable in order to increase the passenger safety by adapting the seat to the morphology of the passenger, and to permit, for two-door vehicles, a folding of the back portion of the seat onto the sitting portion for allowing passengers access to the rear of the vehicle with a single back seat or individual seats.

Mechanisms permitting these various movements of the back portion of the front seat have been known for a long time, but these mechanisms are both rather complex and fragile.

It is therefore an object of the present invention to provide a mechanism in the form of a single-roller locking device that is inexpensive, exhibits no play and yet is very strong, easy to manufacture and very reliable so that by locking the device it resists impacts, frontal as well as lateral, without the respective mechanism being released, thereby providing a high degree of safety for the passengers seated on the seat.

SUMMARY OF THE INVENTION

The single-roller locking device for locking a relative position of a stationary and a mobile element that are articulated relative to one another according to the present invention is primarily characterized by:

a casing of an essentially trapezoidal shape connected to the stationary element;

a rod with a central portion and two lateral guides of a reduced height relative to the central portion, the rod penetrating the casing;

a member having a V-shape with a first and a second side portion, a top portion, and a bottom portion, the first side portion being connected to the casing and the second side portion having a cutout with a lower rounded portion and an upper straight portion extending at an angle of approximately 45°, the top portion having a fork with two arms for engaging therebetween the central portion of the rod in a locking position of the locking device;

each arm having a triangular recess with teeth, the recesses open to the top portion and facing each other;

a toothed roller positioned within the recesses, the toothed roller cooperating with the teeth of the recesses and, in the locking position, pressed against the central portion of the rod;

a spindle rotatably supported within the casing;

a cam having a flat portion and a finger, the cam fixedly connected to the spindle and the flat portion cooperating with the upper straight portion; and a return spring connected with one end thereof to the casing and with the other end thereof to the spindle, with the finger disengaging the toothed roller from the rod upon rotation of the spindle 14 with the cam against the force of the return spring.

During rotation of the spindle with the cam, a portion of the guides engages a top end of the arms so as to maintain rotation of the cam.

During impact in an axial direction of the rod in a released position and in the locking position of the locking device, the toothed roller moves along the teeth of the recesses in the axial direction into locking engagement with the central portion for preventing the rod from sliding.

Preferably, the lower rounded portion of the cutout has a nose-shaped end for cooperating with the finger during rotation of the spindle with the cam such that the finger pushes the member downwardly and disengages the toothed roller from the central portion.

The V-shaped member is preferably made by stamping, and the fork of the V-shaped member is supported by semi-cut lugs connected to the V-shaped member.

The casing is advantageously symmetrical and made of a rigid material.

The rod has expediently a flat section at one end thereof, the flat section having a bore for attaching the rod to the mobile element. Preferably, the stationary element is a sitting portion of a seat and the mobile element is a seat back of a seat.

Various other features of the invention will become more apparent from the following detailed description.

BRIEF DESCRIPTION OF THE DRAWINGS

An embodiment of the invention is shown by way of a non-limiting example in the accompanying drawings, wherein.

DESCRIPTION OF THE PREFERRED EMBODIMENT

Figure 1:
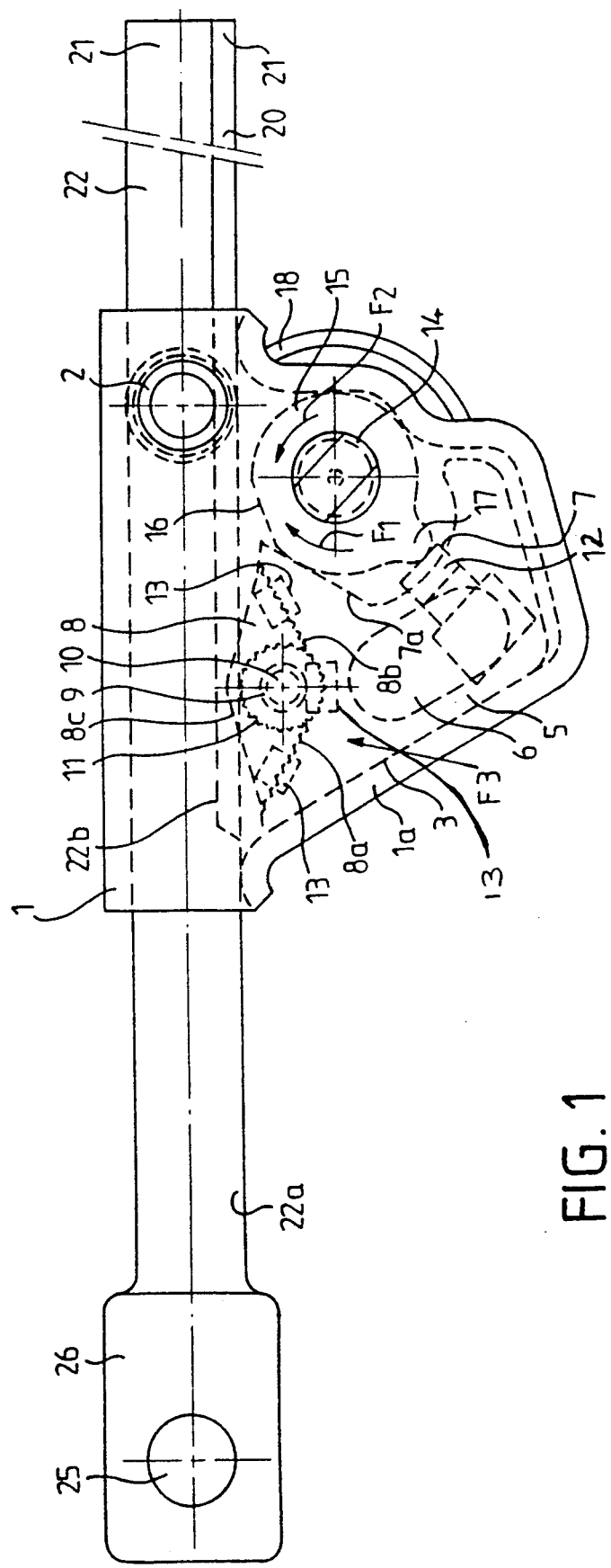
FIG. 1 is a side elevation view of the single-roller locking device according to the present invention.

Referring now to the drawings, FIG. 1 is a side view of a casing 1 having a substantially trapezoidal shape. It is fixed via a bushing 2, for example, to the fixed frame (stationary element) supporting the sitting portion of a seat.

The casing 1 has a lower portion 1a forming an inner slanted portion 3 against which bears the left hand side portion of a member 5 having substantially the shape of a V. This V-shaped member 5 is provided with a recess 6 made by stamping for reducing the weight of the member 5.

Moreover, the V-shaped member 5 comprises, on its right hand side portion, a cutout portion 7 which has a rounded lower portion and an incline at its upper straight portion 7a, substantially at an angle of 45° relative to the rod 21 of the device, in particular at an angle of 60° as shown in the drawing.

Finally, the V-shaped member 5 has a top portion ending in a fork 8 the arms 8a and 8b of which comprise recesses 9 for mounting a pin 10 supporting a toothed roller 11. The inside of the arms 8a, 8b have triangular toothed recesses 9a, 9b accommodating the toothed roller 11 and cooperating with the teeth of the roller 11.

Figure 3:
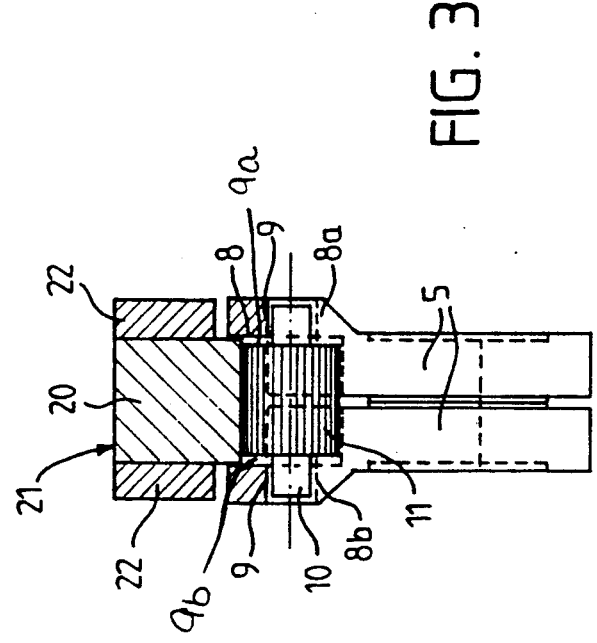
FIG. 3 is a cross-sectional view taken along line III—III of FIG. 2.

As shown in FIG. 3, the V-shaped member 5 is made of two symmetrical parts connected to one another by any convenient means.

The casing 1 is also commonly made of two parts connected together by any known linking members. The casing 1 is made of a rigid material, for example, steel or cast alloys.

Three semi-cut lugs 13 are provided at the member 5 in order to increase the strength of the arms 8a, 8b of the fork 8.

The casing 1 also supports a spindle 14 mounted in the right hand portion of the casing 1. A cam 15 having a flat portion 16 and a finger 17 is fixed to the spindle 14, the finger 17 being positioned substantially at 45° relative to a plane drawn through the axis of the spindle and parallel the flat portion 16.

A spring 18, of which only a portion is seen in FIG. 1, is connected, via one of its ends, to the casing 1 and 12 and via its other end to the spindle 14, so that the tension of the spring 18 forces the cam 15 strongly toward the upper straight portion 7a of the V-shaped member 5 by pushing the V-shaped member 5 upwardly in the direction of arrow $F_3$ (FIG. 1). Consequently, the toothed roller 11 is in strong engagement with the central portion 20 of the rod 21 of the device. The rod 21 is laterally provided with two guides 22 for guiding the central portion 20 of the rod 21 between the two arms 8a, 8b of the fork 8 (see FIG. 3).

Figure 2:
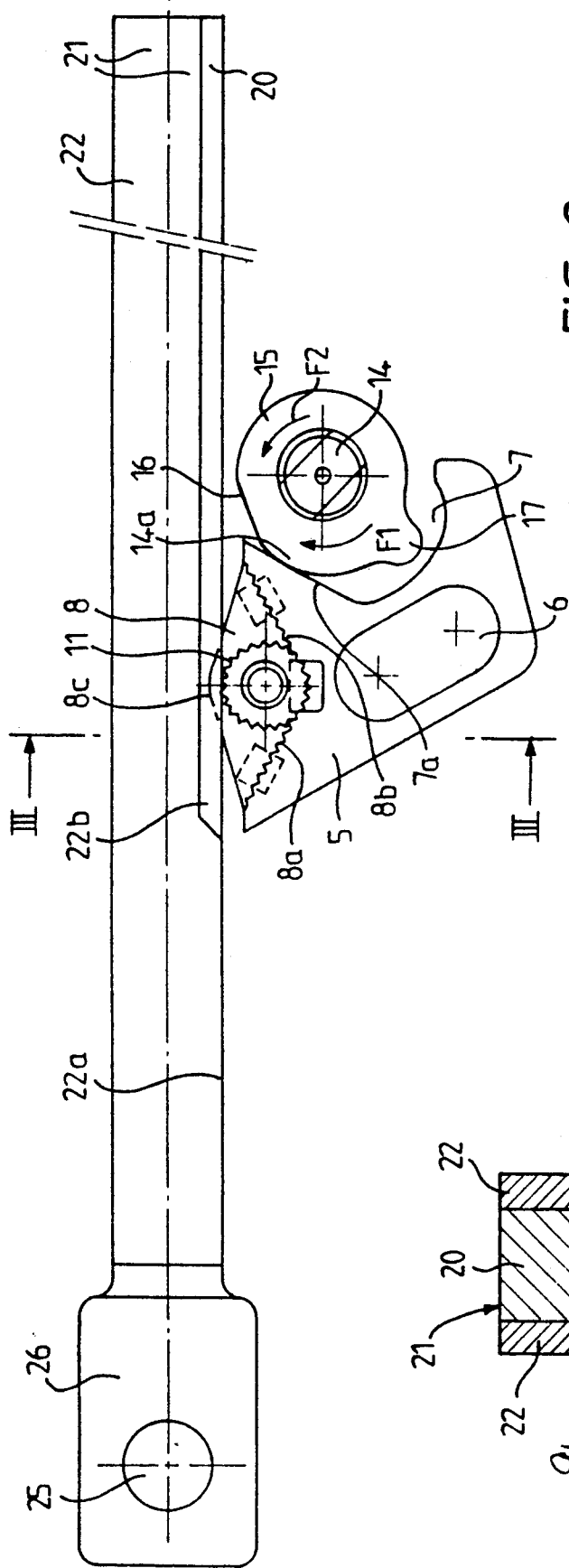
FIG. 2 is a side elevation view of a portion of the single-roller looking device of FIG. 1, showing the position of the members of the locking device when locked.

FIG. 2 shows the position of the cam 15 when the single-roller locking device is locked on the rod 21, since the eccentric portion 14a of the cam 15 is strongly forced against the upper straight portion 7a of the V-shaped member 5 under the action of the spring 18 (here not shown).

Thus, in this position, the rod 21 is locked, and the mobile element, which is connected via a bore 25 formed in the terminal flattened portion 26 on the left of the rod 21, is in a pre-selected position, for example, the inclination of the seat back as desired by the user.

At that moment, the cam 15 is subjected to a force in the direction of arrow $F_1$ (see FIGS. 1 and 2).

Figures 4, 5:
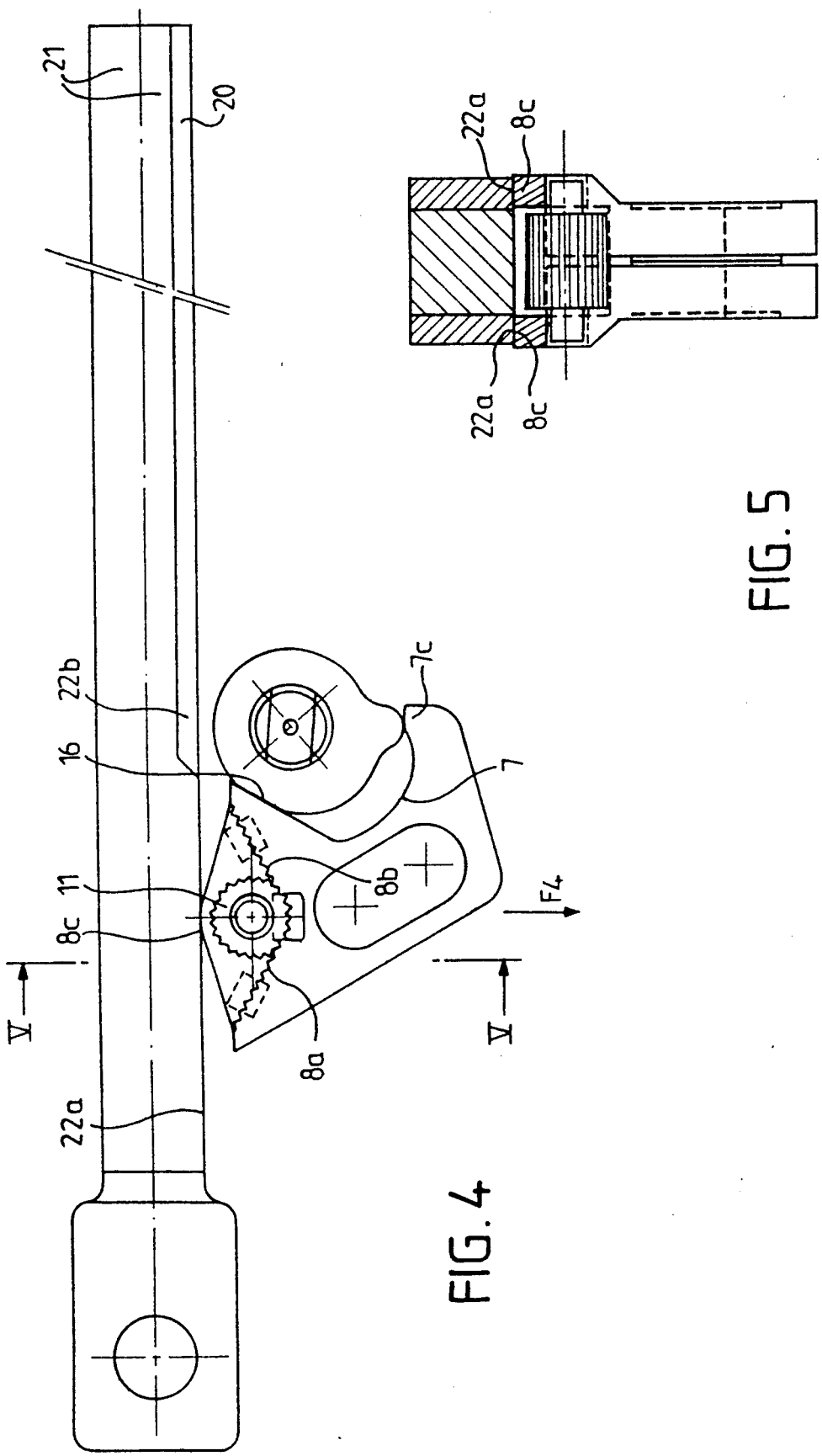
FIG. 4 is a side elevation view of a portion of the single-roller locking device of FIG. 1, showing the position of the members of the locking device when locked.
FIG. 5 is a cross sectional view taken along line V—V of FIG. 4.

When it is desired to modify the position of the mobile element, for example, to modify the inclination of the seat back of a seat, the user will unlock the assembly by rotating, with assistance of a control member (not shown), the spindle 14 in the direction of arrow $F_2$ (see FIGS. 1 and 2), thereby causing a rotation of the cam 15 into the position shown in FIG. 4.

The flat portion 16 comes to bear against the upper straight portion 7a of the V-shaped member 5, and the finger 17 comes to bear on the nose-shaped end 7c of the V-shaped member 5 thereby pushing the V-shaped member downwardly in the direction of arrow $F_4$ (see FIG. 4).

At that moment, the toothed roller 11 is totally disengaged from the central portion 20 of the rod 21 of the locking device which is thus released, so that the inclination of the seat can then be adjusted as desired.

As soon as the user releases the control member, the spring 18 will return the spindle 14, and therefore the cam 15, into the locking position shown in FIGS. 1 and 2, by rotating the cam 15 in the direction of arrow $F_1$ (FIGS. 1 and 2).

The roller 11 comes again into engagement with the central portion 20 of the rod 21 of the locking device, thereby locking the mechanism.

In case of a frontal or side impact, the mass of the roller 11 will cause the roller 11 to move upwardly on one of the toothed arms 8a or 8b of the fork 8 thereby causing a very strong locking of the roller 11 underneath the rod 21, which locks the mobile element of the seat (seat back) with respect to the stationary element (sitting portion) and increases therefore the safety of the passenger seated on this seat. The rigid armature of the seat can thus absorb an abrupt increase of a negative acceleration force caused by the impact.

FIG. 5 shows a position of the locking device used during a frontwardly tilting of the seat back for permitting a passenger access to the vehicle rear seats (Easy-Entry).

A certain length 22a of the two guides 22 comes into engagement at 8c of the arms 8a, 8b, thereby preventing a rotation of the cam 15. When the passengers are seated on the rear seats and when the seat back is tilted rearwardly, the zones 8c will slide on the portion 22a of the two guides 22 and fall inside the recess 22b. At that moment, it is possible for the cam 15, which is no longer retained by the flat portion 16 of the cam 15 on the upper straight portion 7a, to rotate under the action of the spring 18. The assembly of the V-shaped member 5 as well as the roller 11 will move upwardly, and the toothed portion of the roller 11 engages the rod 20.

In order to recover his comfort position, the user must rotate the cam 15 and tilt the seat back rearwardly.

The above-described embodiment discloses the articulation of the seat back of a seat with respect to the sitting portion of the seat, but this locking device could also be used in other cases, for example, in a lifting device for raising the sitting portion of a seat.

The present invention is, of course, in no way restricted to the specific disclosure of the specification and drawings, but also encompasses any modifications within the scope of the appended claims.

What we claim is:

1. A single roller locking device for locking a relative position of a stationary and a mobile element that are articulated relative to one another; said locking device comprising:

a casing of an essentially trapezoidal shape connected to the stationary element;

a rod with a central portion and two lateral guides of a reduced height relative to said central portion, said rod penetrating said casing;

a member having a V-shape with a first and a second side portion, a top portion, and a bottom portion, said first side portion being connected to said casing and said second side portion having a cutout with a lower rounded portion and an upper straight portion extending at an angle of approximately 45° relative to the rod, said top portion having a fork with two arms for engaging therebetween said central portion of said rod in a locking position of said looking device;

each said arm having a triangular recess with teeth, said recesses open to said top portion and facing each other;

a toothed roller positioned within said recesses, said toothed roller cooperating with said teeth of said recesses and, in said locking position, pressed against said central portion of said rod;

a spindle rotatably supported within said casing;

a cam having a flat portion and a finger, said cam fixedly connected to said spindle and said flat portion cooperating with said upper straight portion; and a return spring connected with one end thereof to said casing and with the other end thereof to said spindle, with said finger disengaging said toothed roller from said rod upon rotation of said spindle with said cam against the force of said return spring.

2. A locking device according to claim 1, wherein, during rotation of said spindle with said cam, a portion of said guides engages a top end of said arms so as to maintain rotation of said cam.

3. A locking device according to claim 1, wherein, during impact in an axial direction of said rod in a released position and in said locking position of said locking device, said toothed roller moves along said teeth of said recesses in said axial direction into locking engagement with said central portion for preventing said rod from sliding.

4. A locking device according to claim 1, wherein said lower rounded portion of said cutout has a nose-shaped end for cooperating with said finger during rotation of said spindle with said cam such that said finger pushes said member downwardly and disengages said toothed roller from said central portion.

5. A locking device according to claim 1, wherein said V-shaped member is made of stamping, and wherein said V-shaped member further comprises semi-cut lugs for supporting said fork.

6. A locking device according to claim 1, wherein said casing is symmetrical and made of a rigid material.

7. A locking device according to claim 1, wherein said rod has a flattened portion at one end thereof, said flattened portion having a bore for attaching said rod to the mobile element.

8. A locking device according to claim 7, wherein the stationary element is a sitting portion of a seat and the mobile element is a seat back of a seat.

* * * * *